April 22, 1930. C. H. SMOOT 1,755,567
CENTRALIZED CONTROL FOR GAS PRODUCERS
Filed April 16, 1926
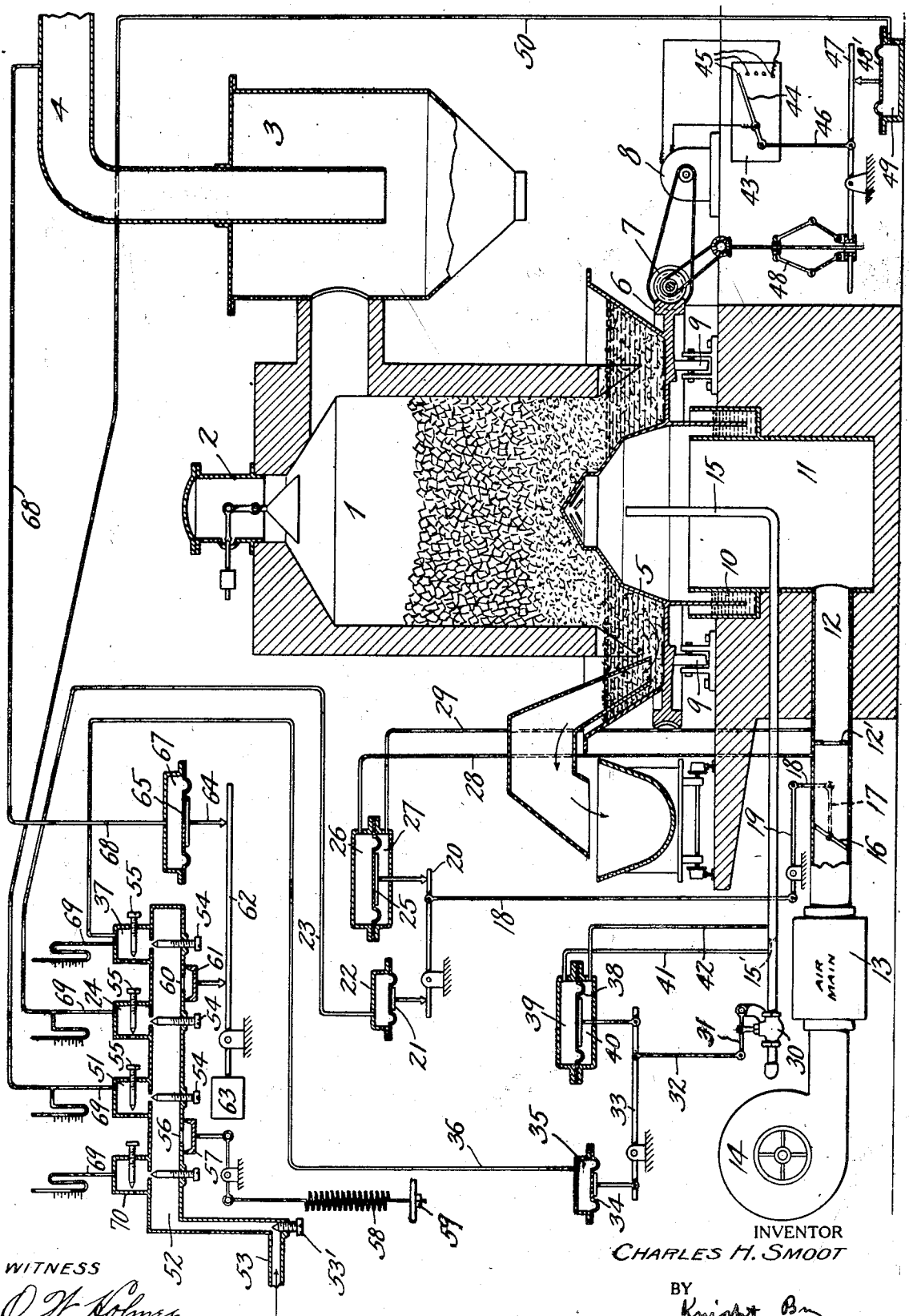
INVENTOR
CHARLES H. SMOOT
BY
ATTORNEYS
WITNESS
O. W. Holmes Patented Apr. 22, 1930

1,755,567

UNITED STATES PATENT OFFICE

CHARLES H. SMOOT, OF MAPLEWOOD, NEW JERSEY

CENTRALIZED CONTROL FOR GAS PRODUCERS

Application filed April 16, 1926. Serial No. 102,479.

This invention relates to gas producers to which fuel is fed and partially burned, with the aid of a supply of air, or air and steam and from which a continuous supply of gas is furnished. The object of the invention is to provide a practicable means of correlating from a centralized controller the variable elements concerned in the production of gas, in such gas producers, in response to the demands. A further object is to provide means for checking the individual controls by the means responsive to the effect produced by such individual controls.

Other objects will appear from the following description in connection with the accompanying drawing which represents a diagrammatic sectionalized view of a particular embodiment of the invention.

A gas producer 1 is shown with the usual fuel feed means 2, at the top, a dust collector 3, and a gas main 4. A rotating grate and ash pan is shown at 5, the same having a worm wheel 6 propelled by a worm screw 7, operated by motor 8. The ash pan rotates on rollers 9 and has an annular water seal 10, to prevent the escape of the air from the forced air draft chamber 11. Air is supplied to this chamber through a pipe 12 leading from main 13 which is supplied with air under pressure by a fan 14. Steam is supplied under the grate by pipe 15. The rate of flow of air in the pipe 12 is controlled by the pivoted damper 16, operated by a lever 17, connecting rods 18, and levers 19 and 20. The lever 20 is under the control of two pressure responsive diaphragms, one of which 21, closes a chamber 22 that is in communication by pipe 23 with a chamber 24 of a master or centralized controller, while the other diaphragm 25 is located between two chambers 26 and 27 which are connected respectively by pipes 28 and 29 to two different longitudinal points of the air pipe 12. The rate of flow of steam in the pipe 15 is controlled by a throttle valve 30 through the means of a lever 31 and connecting rod 32 from a controlling lever 33. This lever 33 is operated by two diaphragms, one of which 34, closes a chamber 35 connected by pipe 36, with a chamber 37, on the master controller, while the other diaphragm 38 is between two chambers 39 and 40, which are connected respectively, through pipes 41 and 42, which communicate with the steam pipe 15, at two points along its length. Pipe 12 may have a septum 12' between the pipes 28 and 29 and the steam pipe may have a similar septum 15' between the pipes 41 and 42. The motor 8 that rotates the grate and ash pan has any suitable controller, such as the rheostat 43, the arm 44 of which may be made to sweep over the contacts 45 by means of connecting rod 46 and lever 47. Lever 47 is under the continued control of a centrifugal governor 48 running synchronously with the motor 8 and a diaphragm 48', which closes chamber 49 from which a pipe 50 extends to a chamber 51 on the master controller. The master controller has a main chamber 52 supplied with compressed air through pipe 53 having a regulating valve 53' and having communication with the auxiliary chambers 37, 24, 51, through apertures regulated by screws 54. Other screws 55 control the escape of the air from the auxiliary chambers. By the adjustment of these screws, it will be understood that the ratio of the pressure in any auxiliary chamber to pressure in the main chamber 52 may be set at any desired amount. An orifice 56 in the main chamber is closed by a cup valve 57, under the influence of a spring 58, the tension of which can be regulated by a nut 59. By this means the pressure of air in the main chamber may be set to vary only within prescribed limits. Another orifice 60 in the main chamber is closed by a cup valve 61, operated by lever 62, which has a weight 63, intended to close the valve and at the other end of the lever articulation 64, to a diaphragm 65, closing a chamber 67, which by means of pipe 68 is in communication with the gas main 4. Gages 69 connected to the chambers 37, 24 and 51 and to the main chamber 52, as at 70, when properly calibrated, serve as indicators at the master controller of the functioning of the various control elements. The master controller is intended to be located at some centralized point so that a person in charge may have convenient means for varying the control and observe by the gages the effects thereof. The master or centralized controller is intended however, when once properly adjusted, to take the place of all manipulation.

The operation of the apparatus is as follows:

When the gas pressure in producer gas outlet main 4 falls the diaphragm 65 will rise under the influence of weight 63 and cause the partial closure of cup valve 61. This will tend to slightly raise the air pressure in chamber 52 which in turn will be passed on to pipes 23 and 36 and to diaphragms 21 and 34. Such increase in pressure will be at a far greater rate than the decreasing pressure in gas main 4 and will operate upon levers 20 and 33 to bring about an opening of damper 16 and throttle valve 30, so as to allow more air and steam to flow to the producer. By suitably proportioning the sizes of the diaphragms and the leverages, the diaphragms 25 and 38 moving under the influence of the increased drop of pressure from one side to the other of septums 12′ and 15′ will arrest the opening of damper 16 and throttle valve 30 to hold the increased flow in air and steam from becoming too great. The flow of air and steam will thus be regulated by the master controller, in response to the demands, as affected by the fluctuation in pressure, by the gas in main 4. As an increased flow of air and steam means a more rapid consumption of fuel it is necessary that the grate and ash pan revolve at a greater speed. An increase of pressure in chamber 52 of the master controller will by causing an increase of pressure in chamber 49 act to cut out resistance in the circuit of motor 8 and the said motor thus running faster, will rotate the grate and ash pan at a speed which will be proportional to the increase of pressure in chamber 52 which in turn is proportional to the increase in the flow of air and gas to the producer. The action of diaphragm 48′ is checked at the proper speed of the motor for the new condition by the centrifugal governor 48 the increased speed of the governor bringing the lever 47 to rest when the speed is right for the new condition.

From the above description, it will be seen that I have described a means of controlling and correlating the various elements entering into the production of the gas in response to the demand for the same and that in addition thereto, I have shown means whereby the individual controllers for the various elements are automatically checked by means responsive respectively to the effect produced upon such individual elements.

While I have described above a control system using air pressure as a force transmitting medium, hydraulic, or electric media may be used in the place thereof, as is well understood by those skilled in the art.

I claim:—

1. In combination with a gas producer provided with air supplying means and a regulator therefor, means responsive to and varying inversely with the pressure of the gas produced, means responsive to and varying with the rate of flow of air to the producer, and a movable member acted upon by both of said means for controlling said regulator.

2. In combination with a gas producer provided with steam supplying means and a regulator therefor, means responsive to and varying inversely with the pressure of the gas produced, means responsive to and varying with the rate of flow of steam to the producer, and a movable member acted upon by both of said means for controlling said regulator.

3. In combination with a gas producer provided with ash removal means and a motor for driving the same, means responsive to and varying inversely with the pressure of the gas produced, means responsive to and varying with the speed of said motor, and a movable member acted upon by both of said means for controlling said motor.

4. In combination with a gas producer provided with air supplying means and a regulator therefor, means for creating a controlling air pressure, means for creating a pressure differential varying with the rate of flow of air to the producer, and a balancing member jointly acted upon by said controlling pressure and by said pressure differential for controlling said regulator to maintain a predetermined relation between the rate of flow of air to the producer and said controlling air pressure.

5. In combination with a gas producer provided with steam supplying means and a regulator therefor, means for creating a controlling air pressure, means for creating a pressure differential varying with the rate of flow of steam to the producer, and a balancing member jointly acted upon by said controlling pressure and by said pressure differential for controlling said regulator to maintain a predetermined relation between the rate of flow of steam to the producer and said controlling pressure.

6. In combination with a gas producer provided with ash removal means and a motor for driving the same, means for creating a controlling air pressure, speed responsive means for creating a force varying with the speed of said motor, and a balancing member jointly acted upon by said pressure and by said force for controlling said motor to maintain a predetermined relation between the rate of ash removal from the producer and said controlling pressure.

7. In combination with a gas producer provided with air supplying means, ash-removal means and a motor therefor and steam supplying means, a centralized controller having means for creating a plurality of pressures varying in response to the pressure of the gas produced, means for creating a pressure differential varying with the rate of flow of air to the producer, means for controlling said air supplying means jointly by said pressure-differential and by one of said plurality of created pressures, means for creating a force varying with the speed of the motor for said ash-removal means, means for controlling said motor in joint response to said force and to another one of said plurality of created pressures, means for creating a pressure differential varying with the rate of flow of steam supplied to the producer, and means for controlling said steam supplying means in joint response to said last-mentioned pressure differential and to still another one of said plurality of created pressures.

CHARLES H. SMOOT.